June 6, 1961     F. W. SAMPSON     2,987,145
BRAKE STRUCTURE
Filed March 3, 1958

INVENTOR.
Frederick W. Sampson
BY
*His Attorney*

United States Patent Office 2,987,145
Patented June 6, 1961

2,987,145
BRAKE STRUCTURE
Frederick W. Sampson, Dayton, Ohio, assignor to General Motors Corporation, Detroit, Mich., a corporation of Delaware
Filed Mar. 3, 1958, Ser. No. 718,788
3 Claims. (Cl. 188—78)

This invention relates to brake assemblies and is particularly concerned with the construction of internal expanding brakes as used in automotive vehicles and the like.

The main object of the invention is to provide a brake assembly which is long wearing and silent in its operation and which provides maximum braking efficiency over long periods of use.

In carrying out this object, it is a further object to provide a brake assembly comprising a secondary lining of sintered ferrous metal including graphite in large quantities in the order of 20% to 30% and a primary brake lining which is predominantly nonmetallic, these linings being used in conjunction with a brake drum having a surface finish measurement not in excess of twenty micro inches.

Further objects and advantages of the present invention will be apparent from the following description, reference being had to the accompanying drawings wherein preferred embodiments of the present invention are clearly shown.

Figure 1:
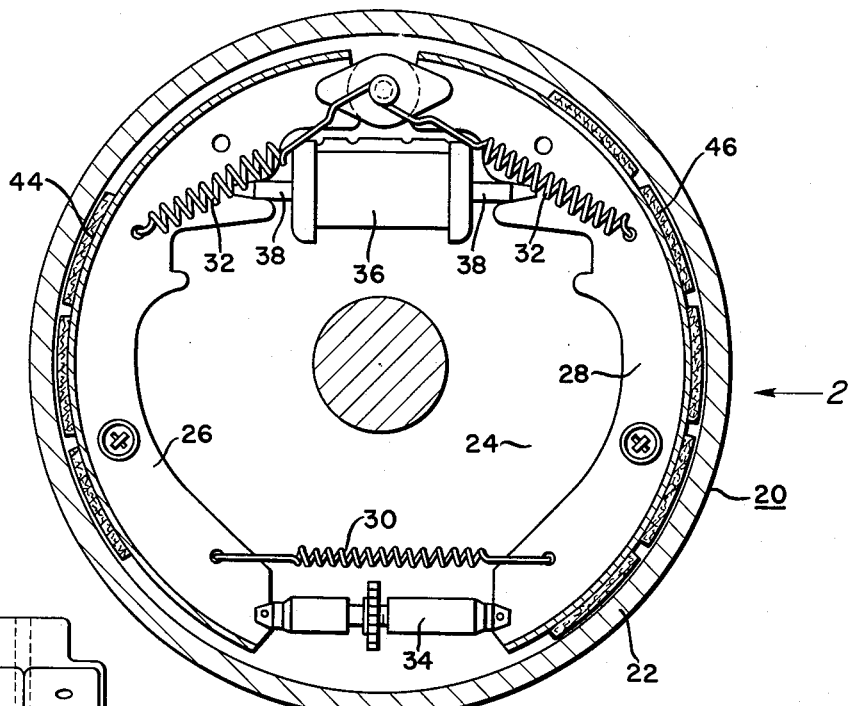
FIGURE 1 is a sectional view of a typical internal expanding brake showing a brake drum and primary and secondary shoes together with hte brake operating mechanism.
Figure 2:
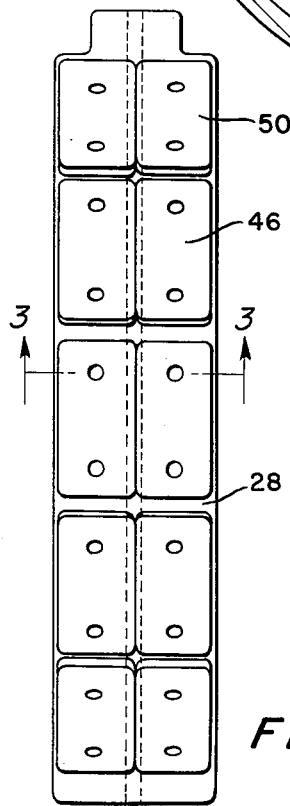
FIGURE 2 is a view of the secondary shoe taken in the direction of the arrow marked 2 in FIGURE 1.

Increased vehicular speeds together with improved roads and heavier vehicles have placed a heavy demand on vehicular brakes. These brakes must now operate from higher speeds than heretofore required which results in considerable overheating of the brakes. Furthermore, due to the improvement in the roads and increase in traffic, vehicles are required to stop more frequently and more efficient braking operations are necessary to bring the vehicle to a stop in a shorter period of time from any given speed.

For these reasons, metallic brakes have come into high favor since such brakes are longer wearing and can tolerate higher braking temperatures without deterioration than can the usual nonmetallic structures. In fact, the braking temperatures normally present under extreme braking conditions with metallic brakes are often well in excess of the temperature which will normally cause complete deterioration of a predominantly nonmetallic molded lining. This high temperature condition is considerably amplified on the secondary shoe wherein the greatest portion of the braking load is absorbed. Furthermore, metallic linings present more uniform braking characteristics with less fade.

One of the undesirable characteristics of the metallic brakes is their tendency to be noisy under certain conditions whereby the noise pattern of the brake is not constant.

I have found that, in an internal expanding brake, it is possible to combine metallic and predominantly nonmetallic linings in a single brake assembly and thereby take advantage of the frictional characteristics of the metallic lining while likewise utilizing the relatively quiet operaton of the nonmetallic lining. This is accomplished by utlizing a predominantly nonmetallic lining such as a molded nonmetallic lining with or without metallic particles dispersed therethrough as the primary shoe. In this position, the lining does not absorb as much heat nor does it do as much work as the same lining in the secondary shoe position.

The secondary shoe lining in this combination is a sintered ferrous lining having a high percentage of graphite therein and specifically the lining disclosed in application S.N. 684,954, filed September 19, 1957, now abandoned, and assigned to the assignee of the present invention. This lining is relatively constant in its frictional characteristics over a wide range of temperatures and is long wearing and generally useful as a brake lining. However, under certain conditions, the lining may become noisy, particularly at the instant the vehicle stops. This condition is prevalent when graphite at the lower end of the range, as set forth in application S.N. 684,954 is used. However, when employed in combination with the nonmetallic primary shoe, there appears to be a combined effect of the two linings over the entire range of graphite which permits full utilization of the many advantages of the metallic lining while providing a brake assembly which is relatively silent in its operation and constant in its characteristics.

In general, the primary lining is of less area than the secondary lining and the placement of the primary lining on the primary shoe may be varied to accomplish varying degrees of reaction therebetween. In other words, it is possible, by moving the position of the primary lining to accomplish variations in pedal pressures, to operate the brake assembly.

Referring specifically to the drawings, a brake assembly is shown at 20 comprising an iron brake drum 22, which may or may not be bonded and backed up by aluminum radiated fins, together with a support plate 24 on which is pivotally mounted a pair of brake shoes 26 and 28 termed the primary and secondary brake shoe, respectively. The brake shoes are held together by springs 30 and 32 and may be adjusted at one end by an adjustable clevis arrangement 34. Adjacent the other end of the brake shoes is a double-acting hydraulic cylinder 36 connected to a master cylinder (not shown) which is actuated by the brake pedal. Cylinder 36 includes a pair of pistons connected to actuating pins 38 at opposite ends thereof. When the brake pedal, not shown, is depressed, fluid enters the cylinder 36 and causes the pistons to move pins 38 outwardly in opposite directions for pivoting the brake shoes 26 and 28. This causes the shoes to move into contact with the drum through their linings 44 and 46. When the linings 44 and 46 are pressed into engagement with the drum surface, the braking action occurs.

The nonmetallic lining is used on the primary shoe 26 and is shown at 44. This lining 44 may be any one of a number of molded nonmetallic materials wherein asbestos, cotton linters and similar fibrous material is molded to shape with a molding resin such as a phenol formaldehyde resin. This fibrous mixture may or may not include quantities of metal powder such as copper, lead, copper-lead, molded therethrough together with friction modifying additions such as graphite, silica, Alundum iron oxide, etc. This lining may be a single piece of material or may be a plurality of segments as desired, and, in either case, the lining may be attached by cement or rivets. Typical linings of this general character are fully disclosed in Patents 2,379,166, 2,536,-136, 2,553,215 and 2,569,539 Any of the materials disclosed therein function quite well in the present combination. It should be understood, however, that any of the conventional molded linings which are predominantly nonmetallic will function in the combination.

The secondary lining shown at 46 is a special sintered ferrous material containing high percentages of graphite and specifically between 20% and 30% by weight thereof with bismuth ranging from 3% to 10% by weight. This lining and variations thereof is fully disclosed in said application S.N. 684,954. Any of the brake linings disclosed in the Examples 1 through 8 thereof will function in this combination and, specifically, the linings set forth in Examples 7 and 8 thereof are particularly desirable.

Figure 3:
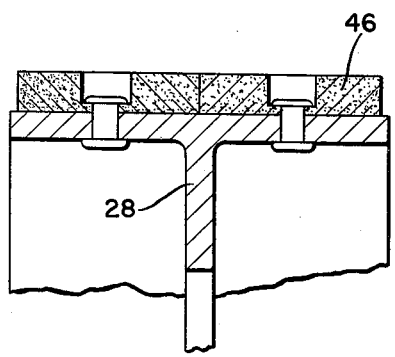
FIGURE 3 is a fragmentary sectional view taken on line 3—3 of FIGURE 2.

It is desirable, for manufacturing reasons, to attach the sintered ferrous lining to the brake shoe in the form of a plurality of substantially rectangular segments 50 which are riveted as shown in FIGURE 3 or are spot-welded or otherwise attached to the brake shoe 28 as noted in the aforementioned application, although this is not a limitation. The ferrous lining may include a stronger metal backing such as a low grapnite sintered material attached coextensively thereto or the ferrous friction surface may be carried by a steel member which is directly attached to the shoe. If desired, it is possible to mold the entire lining in one piece and bond it directly to the shoe or attach it by means of rivets through a backing member. Any of these variations come within the scope of my invention which is specifically directed to a combination wherein high graphite sintered ferrous linings are used as the secondary shoe in combination with predominantly nonmetallic molded linings on the primary shoe of an expanding internal brake element.

The combination of a nonmetallic molded primary lining with a high graphite ferrous metallic lining on the secondary shoe requires that certain critical conditions prevail in connection with the brake drum used in combination with these linings in order for the device to function properly and within acceptable ranges for brake pedal pressures. In other words, if the surface finish of the brake drum is too rough, excessive pedal pressures are required to cause the brake to function wherein such pressures are outside of workable ranges and, therefore, it is extremely important that the initial surface finish of the drum be within specific limits.

In this connection, the surface finish of the brake drum should not measure over twenty micro inches and, when such a finish is present, initial pressures required for bringing an automotive vehicle to a stop are below 40 pounds per square inch and the average pressure runs between 250 and 300 pounds per square inch. Surface finish measurement is a direct measure of roughness of a surface and is expressed in micro inches wherein the designated micro inches indicates the over-all height from the peaks to the valleys of a surface being measured. It is quite apparent that the surface finish of the drum will improve with wear but I have found that it does not improve sufficiently to bring the combination within useful ranges if drums having surface finishes above twenty micro inches are used initially since the wearing-in process requires too much time and too many applications of the brake. Preferably, the surface fiuish should be as smooth as possible and I have found that the resistance of the brake combination toward fade improves with the surface finish while the wearing characteristics of the brake linings are also improved. Specifically, a surface finish of from 5 to 15 micro inches is the preferred range although measurements below the minimum are obviously desirable but are generally difficult to obtain without costly grinding or honing operations which make the cost of the drum too high for commercial use.

The braking pressures set forth in this paragraph were obtained with a cast iron drum machined to a surface finish of twenty micro inches wherein the primary lining was a molded nonmetallic lining made from asbestos fiber 45 parts, cotton linters 25 parts, polymerized cashew nut shell oil dust 10 parts with a phenol formaldehyde resin binder making up the remainder by weight. The metallic linijng was a sintered mixture of iron 67 parts, graphite 30 parts, copper 8 parts and bismuth 5 parts, all proportions being expressed as parts by weight. The ratio of the areas of the primary and secondary linings was 3 to 5. Similar results can be obtained with other lining combinations providing the primary lining is a molded, substantially nonmetallic lining and the secondary lining is a ferrous sintered lining having graphite present in quantities by weight of 20% and above.

It is believed that the smoothness of the drum improves the operation of the brake and substantially eliminates fade therefrom due to the fact that there is a tendency for some dust to wear off the metallic lining which transfers to the nonmetallic lining. This causes an increase in the effectiveness of the nonmetallic lining which creates noise and erratic operation. By using a very smooth drum, the wear on the metallic lining is less and, therefore, the transfer of dust from the metallic to the nonmetallic lining is less which enhances the effectiveness of the lining combination and reduces, if not eliminates, the change in braking characteristics. Then, too, it should be pointed ot that a rough surface drum tends to hold dust in the pockets between the high points of the drum which dust will become dislodged periodically to create unstable conditions in the brake if any substantial quantities thereof are present. The smoother the drum, the less formation of dust is apparent and the less pick-up of dust is possible within the cavities within the drum. Thus, the use of rough drums self-aggravates the erratic conditions prevalent in the brake combination so that the smoother the drum, the more satisfactory and constant are the braking characteristics of the braking assembly.

I have found that, over long periods of accelerated testing, braking combinations using drums having a surface finish of twenty micro inches and below and using a high graphite, ferrous secondary lining with a molded, nonmetallic primary lining produce a combination that results in quiet and uniform operation over many thousands of miles of driving wherein erratic conditions and noise, usually present in brakes, are eliminated and wherein the over-all wear of the combination is considerably reduced so that the brake linings are effective over longer periods of time. It will be noted that the primary lining which is nonmetallic is of less area than the secondary lining which is metallic. This combination wears substantially uniformly since the primary lining acts as an energizing source for the secondary lining which, in itself, absorbs the major portion of the energy required to bring the vehicle to a stop and, in the present combination, the secondary lining, being formed of metallic material, is very rugged and long wearing.

While the embodiments of the present invention as herein disclosed constitute preferred forms, it is to be understood that other forms might be adopted.

What is claimed is as follows:

1. A brake assembly, comprising in combination; a rotatable metallic brake drum having a surface finish measurement not in excess of twenty micro inches, a nonrotatable internal expanding brake device positioned within said brake drum and comprising brake actuating mechanism and a primary and secondary shoe operated by said mechanism, a predominantly nonmetallic molded resin bonded friction lining carried by said primary shoe and a sintered ferrous metallic lining carried by the secondary shoe, said linings being adapted to be actuated into rubbing engagement with said drum by said mechanism.

2. The assembly as claimed in claim 1 wherein the ratio of areas between the primary and secondary shoes is in the order of 3 to 5.

3. The brake assembly as claimed in claim 1 wherein the primary lining comprises a molded resin impregnated predominantly nonmetallic material, and the sec- (References on following page)

ondary lining comprises a plurality of blocks of sintered ferrous material.

References Cited in the file of this patent

UNITED STATES PATENTS

| | | |
|---|---|---|
| 1,930,779 | Snell | Oct. 17, 1933 |
| 2,028,621 | Norton | Jan. 21, 1936 |
| 2,793,427 | Marvin | May 28, 1957 |
| 2,818,941 | Berno | Jan. 7, 1958 |

OTHER REFERENCES

Publications: Wear and Surface Finish, Gisholt Machine Co., Madison, Wisconsin, received by U.S. Patent Office February 2, 1949, pages 35, 70—71 and 75. Modern Brakes, by J. A. McLaine, Engineering Dept. of American Brakeblock, Detroit, Michigan, vol. 1, No. 6, page 2, column 2.